(12) United States Patent
Wagner et al.

(10) Patent No.: US 8,205,195 B2
(45) Date of Patent: Jun. 19, 2012

(54) METHOD AND SYSTEM FOR AUTOMATICALLY CLASSIFYING AND INSTALLING PATCHES ON SYSTEMS

(75) Inventors: André Wagner, Sinsheim (DE); Andreas Poth, Weingorten (DE); Baré Said, St Leon (DE); Christoph Luebbe, Bruchsol (DE); Horst Schaude, Kraichtal (DE); Silke Storch, Rauenberg (DE); Tobias Brandl, Walldorf (DE)

(73) Assignee: SAP AG, Walldorf (DE)

( * ) Notice: Subject to any disclaimer, the term of this patent is extended or adjusted under 35 U.S.C. 154(b) by 1185 days.

(21) Appl. No.: 11/811,323

(22) Filed: Jun. 8, 2007

(65) Prior Publication Data
US 2008/0307407 A1 Dec. 11, 2008

(51) Int. Cl.
G06F 9/44 (2006.01)
(52) U.S. Cl. ......... 717/168; 717/171; 717/172; 717/173
(58) Field of Classification Search .................. 717/173, 717/171, 172
See application file for complete search history.

(56) References Cited

U.S. PATENT DOCUMENTS

| | | | | |
|---|---|---|---|---|
| 7,069,547 | B2 * | 6/2006 | Glaser | 717/154 |
| 7,614,046 | B2 * | 11/2009 | Daniels et al. | 717/170 |
| 7,975,264 | B2 * | 7/2011 | Sriram et al. | 717/169 |
| 8,065,672 | B2 * | 11/2011 | Sriram et al. | 717/169 |
| 2002/0174422 | A1 * | 11/2002 | Kelley et al. | 717/178 |
| 2006/0130040 | A1 * | 6/2006 | Subramanian et al. | 717/168 |
| 2006/0288341 | A1 * | 12/2006 | Wurden et al. | 717/168 |
| 2007/0033445 | A1 * | 2/2007 | Hirsave et al. | 714/47 |

OTHER PUBLICATIONS

Arora et al., "Research Note—Sell First, Fix Later: Impact of Patching on Software Quality", 2006, pp. 465-471.*
Lippmann et al., "The Effect of Identifying Vulnerabilities and Patching Software on the Utility of Network Intrusion Detection", 2002.*
S. Brown, "Updating Software in Wireless Sensor Networks: A Survey", 2006.*

* cited by examiner

Primary Examiner — Phillip Nguyen
(74) Attorney, Agent, or Firm — Kenyon & Kenyon LLP (57) ABSTRACT

A tool for classifying and installing patches on terminals. Specifically, when a patch is designed, it may be automatically installed on a terminal if it does not have a direct impact on the terminal and is not in an area which relevant to the terminal user.

15 Claims, 7 Drawing Sheets

METHOD AND SYSTEM FOR AUTOMATICALLY CLASSIFYING AND INSTALLING PATCHES ON SYSTEMS

BACKGROUND

The present invention relates to a tool for classifying and installing patches in distributed computerized software systems. Specifically, when a patch is designed, it may be automatically installed on a user's terminal if it is classified as not having a direct impact on the user's terminal and does not relate to an area of the user's terminal which is being used by the user.

Currently, many users do not install patches on their computer terminals because of their unknown impact on the terminals. Consequently, there are user terminals with varying levels of patches installed. The varying levels of installed patches make it difficult to determine the correct patch for a specific terminal when a specific error is reported. It is very costly and time-consuming to try to make sure that there is consistency amongst users' terminals by ensuring that they have the same level of installed patches.

Automated patch installation is an available, useful technique to help maintain computer networks. However, current systems which automatically install patches suffer from several drawbacks. First, they might be fully automated, in which case an operator has no discretion regarding how or when to deploy them on his terminal. This may result in down time on a system at an undesirable time for the user. Alternatively, patches might be installed only after receiving an operator's command to install, which can be arbitrarily withheld from the system and frustrate the installation process. This may lead to unforeseen performance problems. For example, if certain patches are designed under an assumption that a prior patch was installed, when in fact the prior patch was not installed, a system error may result.

SAP's Note Assistant is available for automatically installing patches on users' terminals is the SAP Note Assistant. SAP Notes provides instructions on how to remove known errors from SAP Systems. They include a description of the symptoms, the cause of the error, and the SAP Release and Support Package level in which the error occurs. SAP Note Assistant allows you to load SAP Notes into your system and to automatically implement the corrections. SAP Note Assistant determines the dependencies of different Notes. However, a Note which corrects a reported error can require many other Notes to be installed before it may be installed. This may cause significant system downtime.

DETAILED DESCRIPTION

Embodiments of the present invention work cooperatively with existing computer systems to automatically classify all patches according to a hierarchy and to install the patches on terminals based on their classifications. Generally, patches may be classified based on perceived impact of the patch on a terminal and based on relevance for the business process of the user. A developer may decide that a given patch has a "direct impact" on a given terminal and may identify the patch as such using metadata or another appropriate identifier. The developer may also decide whether a given patch is "relevant" to the terminal user, i.e., if it is in an area of the system used by the user. Alternatively, whether a patch is relevant may be automatically determined by the Patch Classification system. This may be determined, for example, based on a history of user activity. When a patch is coded as having a "direct impact" on a terminal and being "relevant" to the terminal, the patch may be presented to a terminal user before installation. If the given patch does not have a direct impact on the terminal and is not relevant to the terminal, the patch may be installed on the terminal automatically by the Update Process and no update information may be presented to the user.

Certain patches may have a direct impact on a terminal and but may be irrelevant to the terminal user. In this case, the patch may be applied automatically and no information may be presented to the user. A patch may not have a direct impact on a terminal but may be relevant to the terminal user. In this case, the patch may be applied automatically and update information may be shown to the user. Here, relevance means that the user is using the subject application or other.

A patch may be classified as relevant based on user activity, for example, whether the user is currently using the application to which the patch is to be applied. A terminal may be monitored to determine which applications are used on the terminal and the frequency with which the applications are used. Further, which functions are used within an application on a terminal may also be determined. Data may be stored for each terminal indicating which applications, and functions within the applications, are used on the terminal and the frequency with which they are used. An automated system may determine whether a patch is relevant to a terminal. An algorithm may be defined to determine whether a patch is relevant to a terminal. This algorithm may be defined based on how often an application is used, the duration of use for an application, the amount of functions used within an application, etc. For example, all applications which are used at least ten times per month may be coded as relevant. As another example, all applications which are used for at least ten hours per month may be coded as relevant.

A patch which is "automatically" installed on a terminal may be installed at a default time. The default time may be, for example, immediately. Alternatively, the default time may be any time pre-set by the developer or the user. A different default time for automatic installation of patches may be maintained for each terminal. Alternatively, one default time may be stored and used for automatic installation of patches for all terminals on the network.

Figure 1:
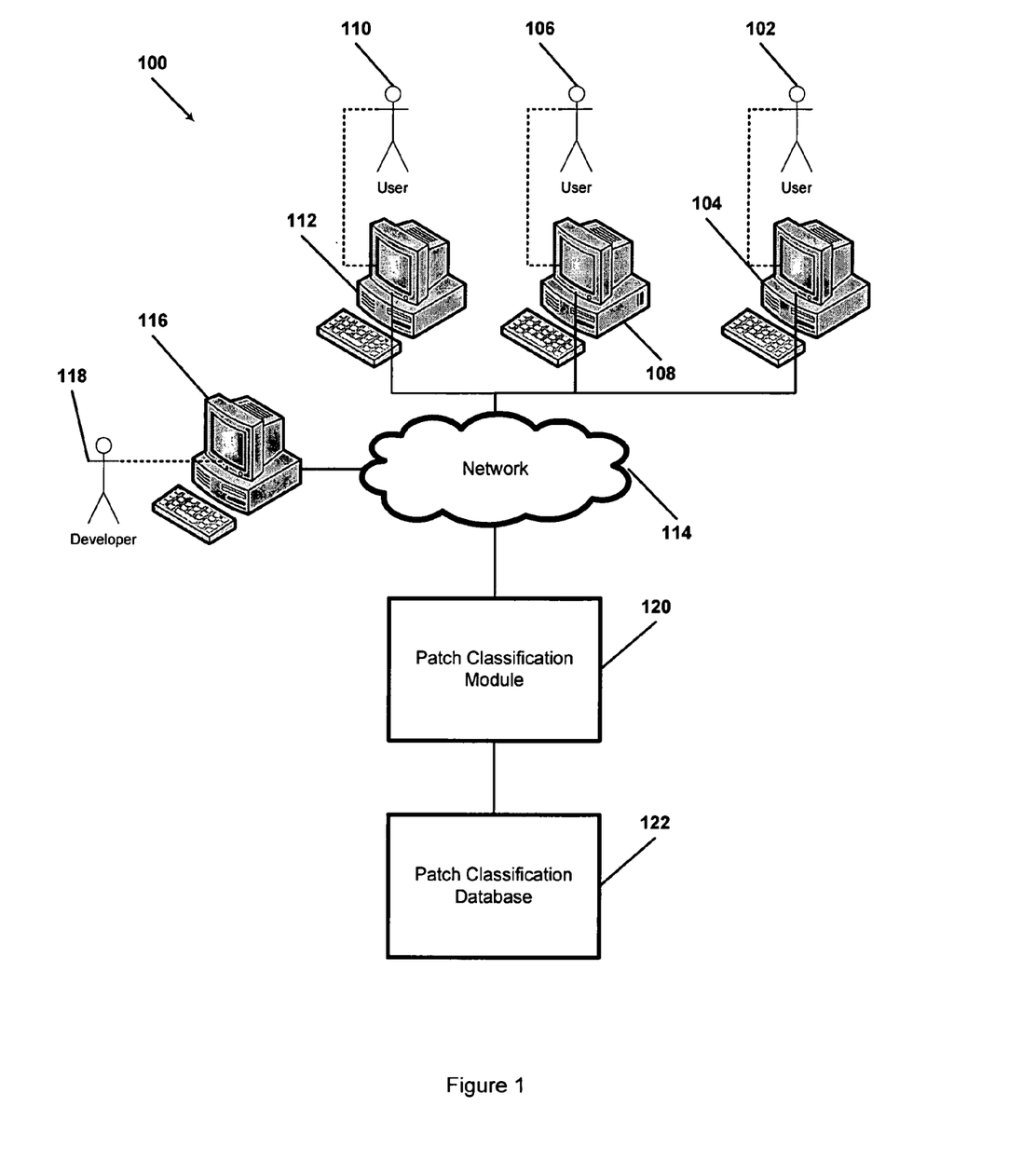
FIG. 1 is a simplified block diagram of a computer system according to an embodiment of the present invention.

FIG. 1 is a simplified block diagram of an exemplary computer system 100 suitable for use with the present invention. As illustrated, the system can include several computer terminals 104, 108, 112 and 116 interconnected by a network 114. The terminals may be associated with respective users 102, 106, 110 and 118. In the example of FIG. 1, user 118 is shown as a developer; user 118 may author the patches that are to be installed on the terminals 104, 108 and 112 of the other users 102, 106 and 110. Although the users 102, 106, 110 and 118 are shown as concurrently connected to a common network 114, this need not be so; indeed, it is commonplace for software developers to design and publish software patches from a first enterprise network and publish them for consumers at other enterprise networks for installation. Such differences in implementation are immaterial for purposes of the present discussion unless noted otherwise.

The network 114 may include network entities (not shown) that install software patches on individual terminals 104, 108, 112; such entities are known in the art. According to an embodiment of the invention, the network 114 may include a patch classification module 120 that classifies patches received from the developer 118. The network 114 also may include a patch classification database 122 that stores activity profiles of the users 102, 106 and 110.

During operation, patches may be created by a developer 118, and received by the patch classification module 120 via network 114. The patch classification module 120 may search the patch classification database 122 to classify the patch with respect to each user's terminal. For example, the patch classification module 120 may determine whether the patch has a direct impact on a respective user's system, and whether the patch is relevant to the respective user's system. As noted, the developer may define when a patch is considered to have a direct impact on a user's system. Additionally, the developer may define when a patch is considered to be relevant to a user's system. Alternately, whether a patch is relevant to a user's system may be automatically determined by a designated algorithm. Relevance may be based, for example, on a user's history of activity. The patch classification database 122 may contain a record for each computer system in the network 114. Each record may contain information indicating which objects have a direct impact on the user's system, and which software programs are relevant to the user's system. By searching through the records in the patch classification database 122, the patch classification module 120 may be able to determine whether a patch would be in an area of direct impact and/or whether a patch would be relevant for each system on the network 114.

Once the patch classification module 120 has determined which systems a given patch has a direct impact on, and which systems a given patch is relevant to, it may determine which systems will automatically receive the patch. The patch classification module 120 may automatically install the patch, via network 114, on all systems in which the given patch does not have a direct impact and to which it is not relevant. For example, a patch may not have a direct impact on system 104, and it may also not be relevant to system 104. Therefore, the patch classification module 120 may automatically install the patch, via network 114, on system 104.

With respect to a system where a given patch has a direct impact, and is relevant, the patch classification module 120 may send a message to the system via network 114 asking the user to choose a time to install the patch. For example, a patch may have a direct impact on system 108, and it may also be relevant to system 108. Therefore, the patch classification module 120 may send a message to system 108, via network 114, asking the user 106 to select a time for the patch to be deployed. The selected time may be returned to the patch classification module 120 via network 114. At the time selected, the patch classification module 120 may install the patch on system 108.

In another embodiment, alternative combinations are contemplated, e.g., depending upon the direct impact of the patch on the system and/or the relevance to the system. User interaction may or may not be allowed to preserve the integrity of the system.

Figure 2:
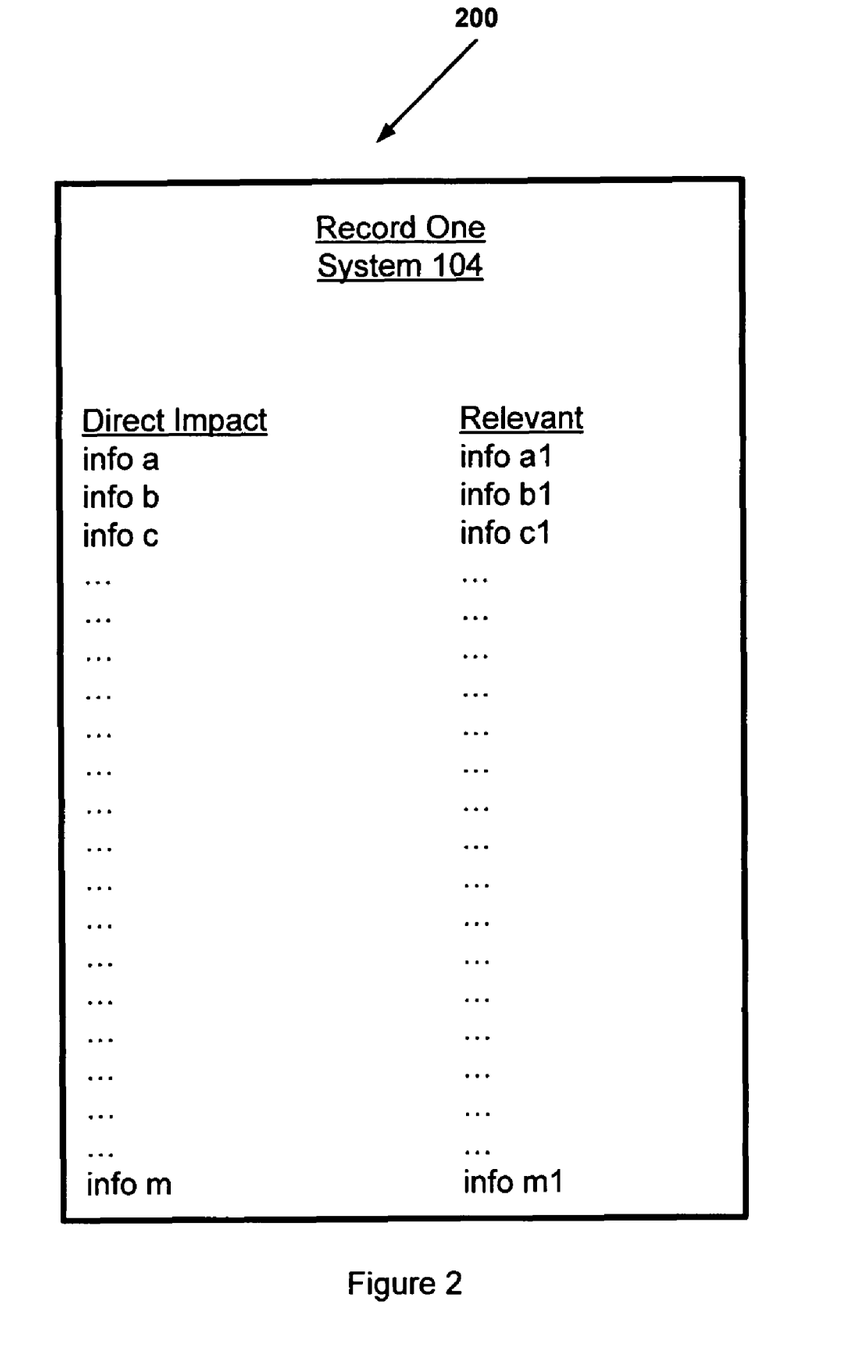
FIG. 2 is a diagram of an embodiment of a record saved in the patch classification database.

FIG. 2 illustrates an exemplary record 200 stored in the patch classification database 122 referenced in FIG. 1. Example record 200 is associated with system 104, referenced in FIG. 1. Record 200 stores information identifying all the elements of system 104 that have a direct impact on system 104, and all the elements of system 104 that are relevant to system 104. When the developer 118 sends a patch to the patch classification module 120 via network 114, the patch classification module 120 may search the patch classification database 122. The patch classification module 120 may scan each record in the patch classification database to determine whether the element which the patch corresponds to has a direct impact and/or is relevant to each system on the network 114. Each record in the patch classification database 122 may correspond to a system on the network 114. The patch classification database 122 may maintain a count of the total number of records in the patch classification database 122.

Figure 3:
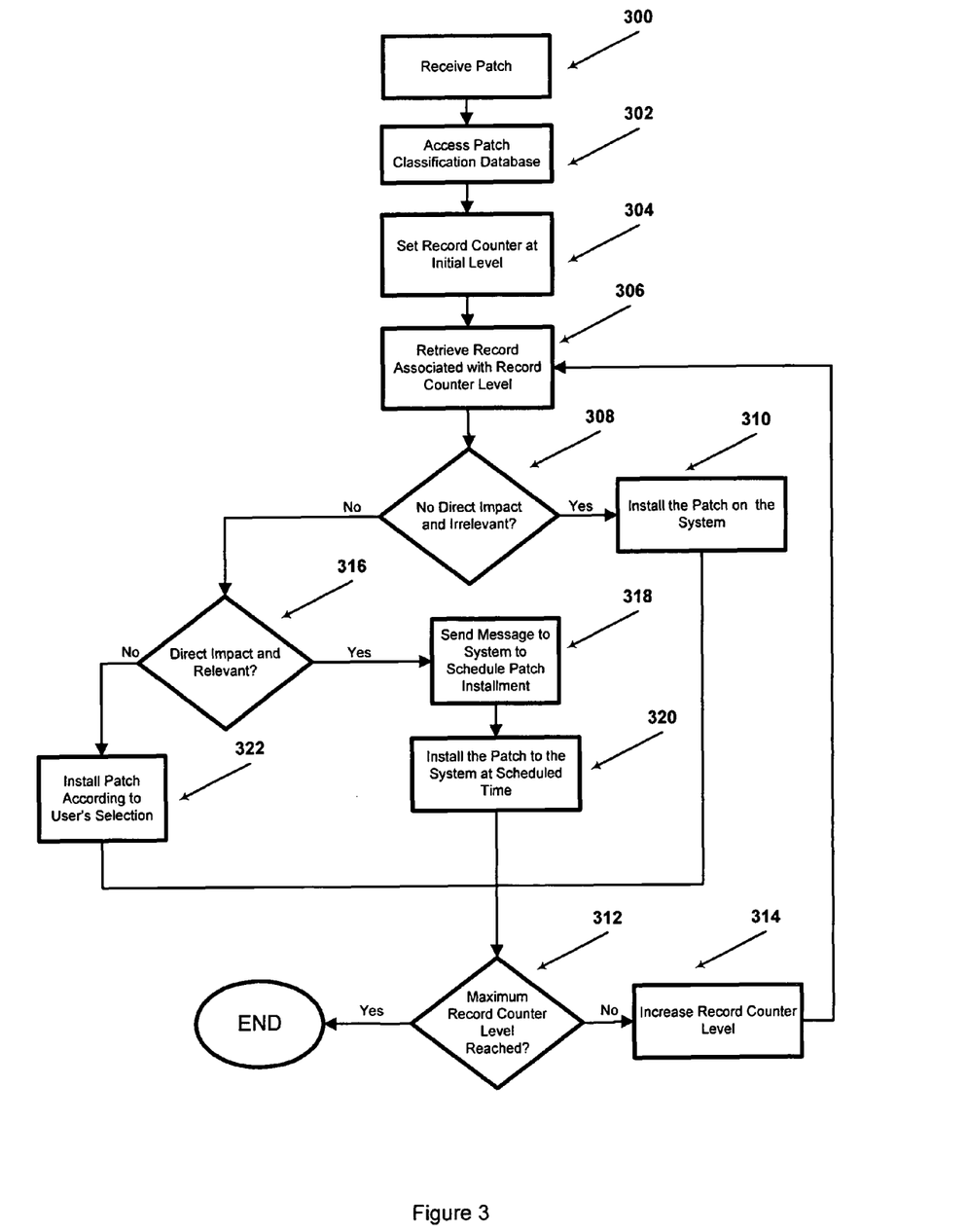
FIG. 3 is a dataflow diagram illustrating the operation of an embodiment of the present invention.

FIG. 3 is a dataflow diagram illustrating operation of system 100 for one embodiment of the present invention. The method begins when a developer sends a patch to the patch classification module 120 via network 114, step 300. The patch classification module may then access the patch classification database 122, step 302. The patch classification module may set the initial record counter level, step 304. The initial record counter level may be, for example, one. The patch classification module 120 may search all records in the patch classification database 122 corresponding to all systems on network 114, beginning at the first record. For example, the first record may be record number one. The patch classification module 120 may retrieve the record associated with the record counter level, step 306. For example, if the record counter level is one, the patch classification module 120 may retrieve record number one. Each record may be associated with a system on the network 114. For example, as shown in FIG. 2, Record One may be associated with system 104.

The patch classification module 120 may then determine whether the patch neither has a direct impact on the system nor is relevant to the system, step 308. The patch classification module 120 may scan the retrieved record to make this determination. If the patch does not have a direct impact on the system and is irrelevant to the system, the patch classification module 120 may automatically install the patch on the system, step 310. The patch classification module 120 may then determine whether the maximum record counter level has been reached, step 312. The patch classification database 122 may maintain a count of the number of records contained within it. The patch classification module 120 may compare the record number counter with the number of records in the patch classification database to determine if the record counter number is less than the total number of records stored within the patch classification database 122. If the record counter number is less than the number of records stored within the patch classification database 122, then the maximum record counter level has not been reached. The patch classification module 120 may then increase the record counter number, step 314. Then, the patch classification module 120 may retrieve the record associated with the new record counter level, step 306, and continue with the method described above. If, however, the record counter is equal to or greater that the number of records stored within the patch classification database 122, the maximum record counter level has been reached. The patch classification module 120 has completed its task with respect to the patch, and the method ends.

If the patch has a direct impact on the system and/or is relevant to the system, the patch classification module 120 may then determine whether the patch both has a direct impact on the system and is relevant to the system, step 316.

If the patch has a direct impact on the system and is relevant to the system, the patch classification module 120 may then send a message to the system requesting that the user schedule a time for installment of the patch, step 318. The patch classification module 120 may install the patch on the system at the time specified by the user, step 320. Thereafter, the patch classification module 120 may determine whether all the records have been searched, according to the method discussed above, step 312. If all the records have not been searched, the record counter may be increased, step 314, and the next record may retrieved, step 306. If all the records have been searched, the method ends.

If the patch has a direct impact on the system and is relevant to the system, the patch may be automatically installed on the user's system or a message may be sent to the system asking the user to schedule a time for installment, depending on a user's preference, step 322. Thereafter, the patch classification module 120 may determine whether all the records have been searched, according to the method discussed above, step 312. If all the records have not been searched, the record counter may be increased, step 314, and the next record may be searched, step 306. If all the records have been searched, the method ends.

Figure 4:
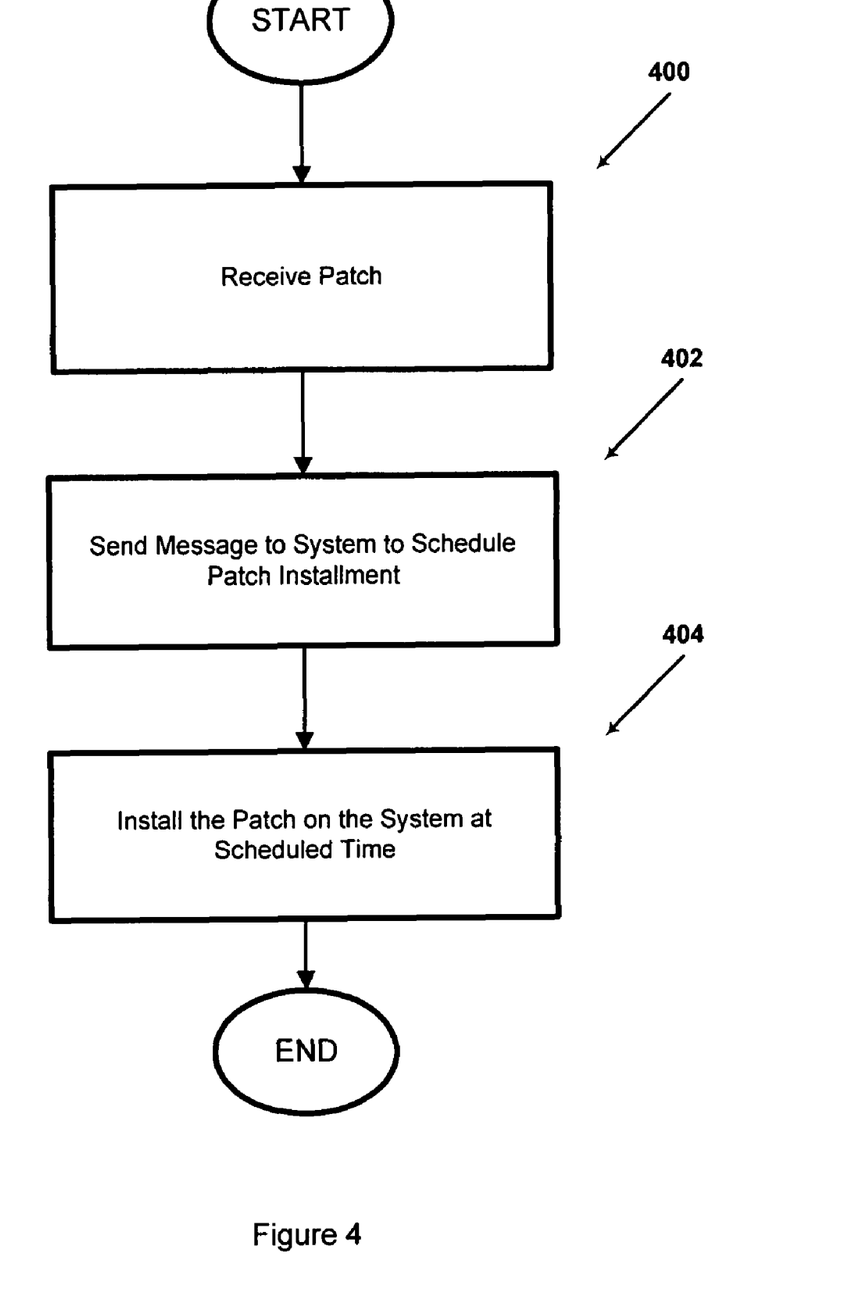
FIG. 4 is a dataflow diagram illustrating the operation of an embodiment of the present invention.

FIG. 4 is a dataflow diagram illustrating operation of system 100 for one embodiment of the present invention. This embodiment of the present invention operates when the patch has a direct impact on a system and is relevant to a system. The method begins when a developer sends a patch to the patch classification module 120 via network 114, step 400. The patch classification module 120 may then send a message to the system requesting that the user schedule a time for installment of the patch, step 402. The patch classification module 120 may install the patch on the system at the time specified by the user, step 404.

Figure 5:
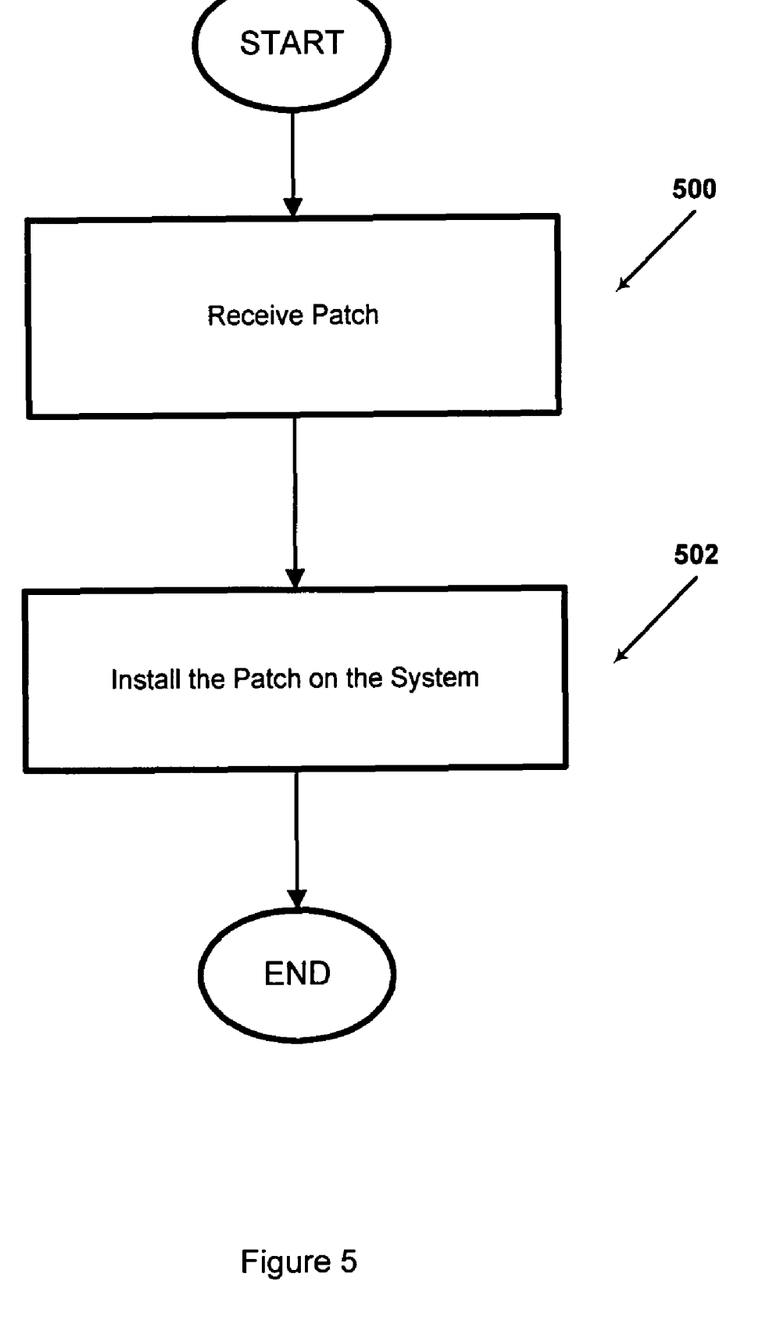
FIG. 5 is a dataflow diagram illustrating the operation of an embodiment of the present invention.

FIG. 5 is a dataflow diagram illustrating operation of system 100 for one embodiment of the present invention. This embodiment of the present invention operates when the patch does not have a direct impact on a system and is irrelevant to a system. The method begins when a developer sends a patch to the patch classification module 120 via network 114, step 500. The patch classification module 120 may automatically install the patch on the system, step 502.

Figure 6:
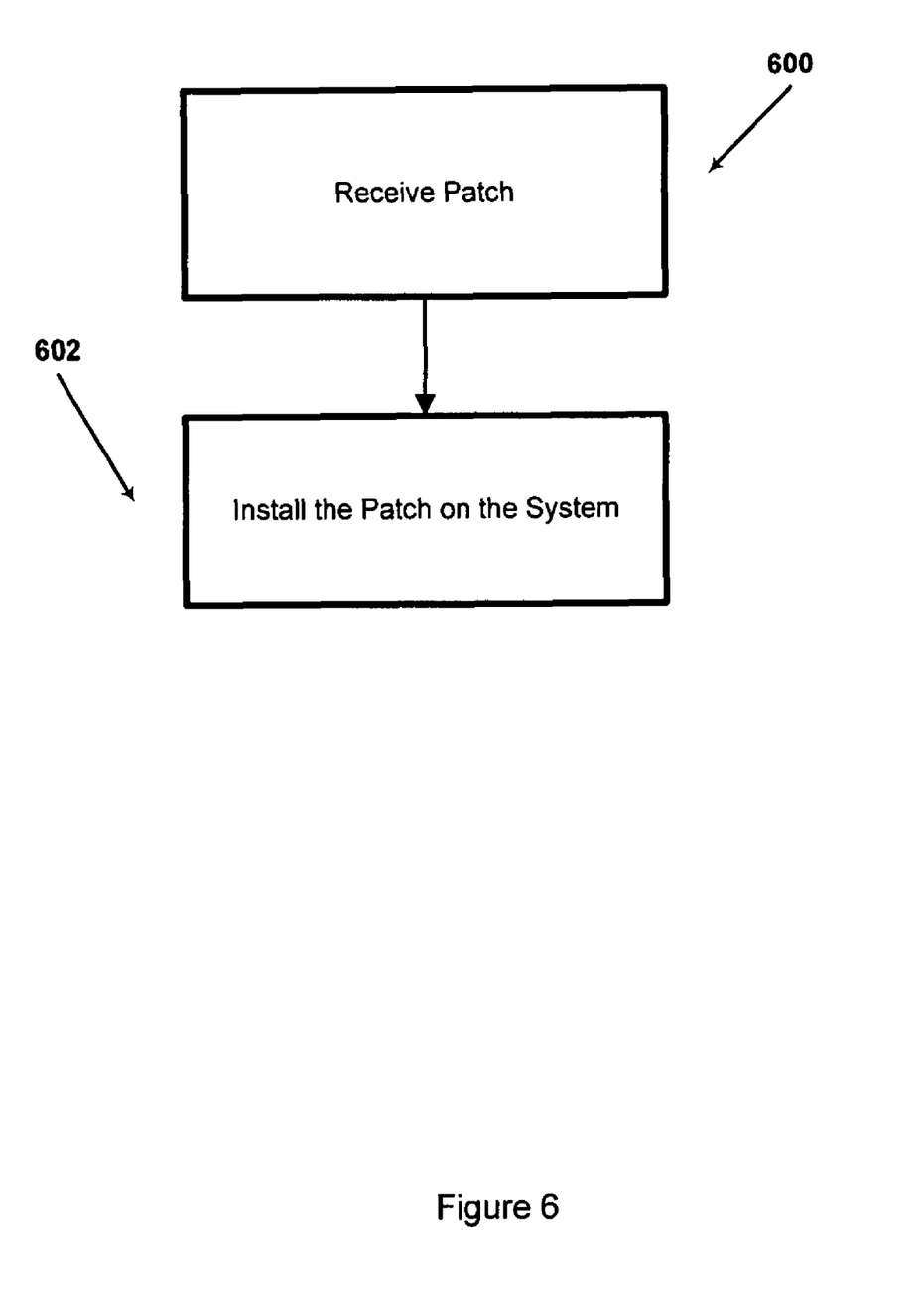
FIG. 6 is a dataflow diagram illustrating the operation of an embodiment of the present invention.

FIG. 6 is a dataflow diagram illustrating operation of system 100 for one embodiment of the present invention. This embodiment of the present invention operates when the system is sensitive to a patch that does have a direct impact on the system but is irrelevant to the system. The method begins when a developer sends a patch to the patch classification module 120 via network 114, step 600. The patch classification module 120 may automatically install the patch on the system, step 602.

Figure 7:
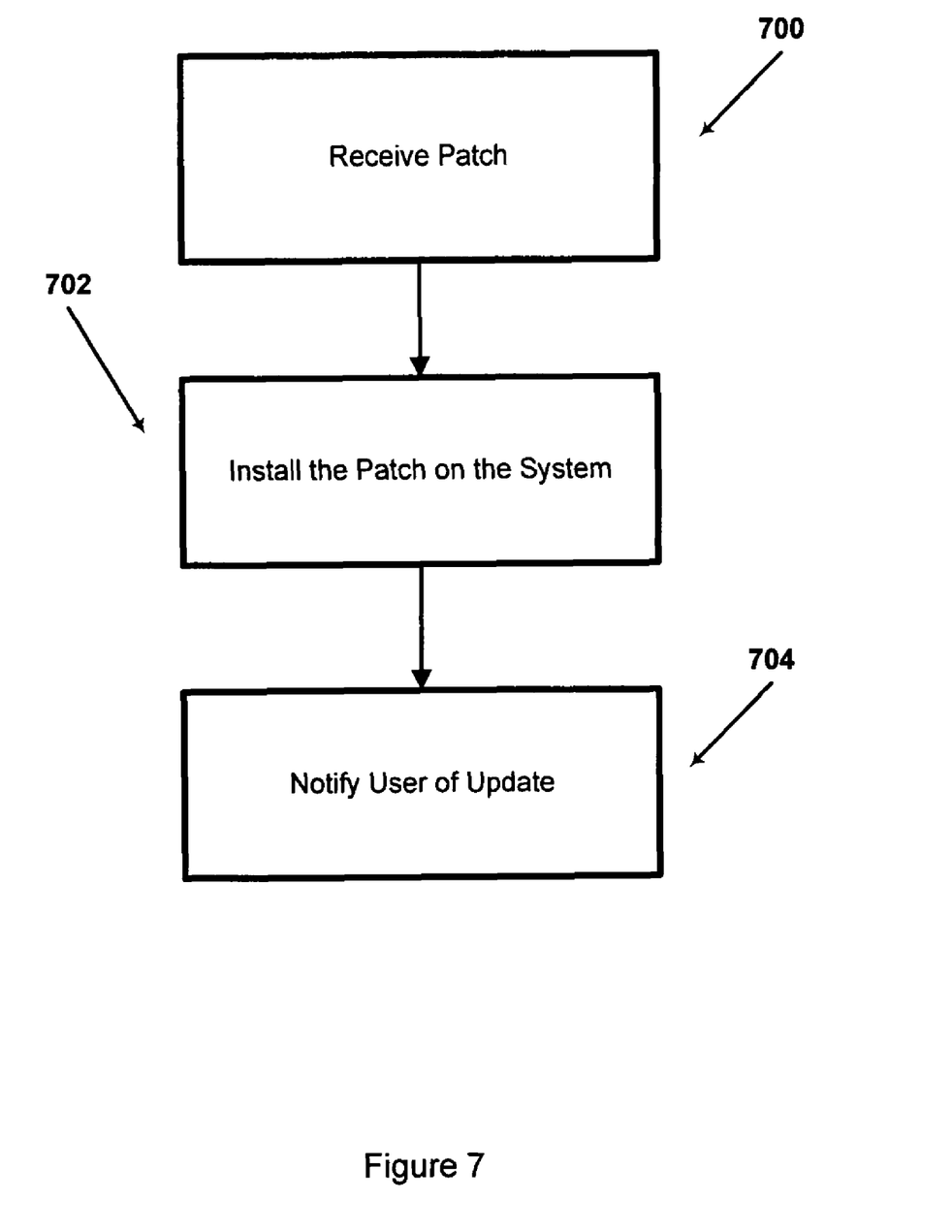
FIG. 7 is a dataflow diagram illustrating the operation of an embodiment of the present invention.

FIG. 7 is a dataflow diagram illustrating operation of system 100 for one embodiment of the present invention. This embodiment of the present invention operates when the system is sensitive to a patch that does not have a direct impact on the system but is relevant to the system. The method begins when a developer sends a patch to the patch classification module 120 via network 114, step 700. The patch classification module 120 may automatically install the patch on the system, step 702. The patch classification module 120 may send notification of the update to the user, step 704.

Another embodiment of the present invention involves a computer system for classifying and deploying patches to systems, having:
an arrangement for receiving a patch;
for each system in a network, an arrangement for determining if the patch has a direct impact on the system and if the patch is relevant to the system;
an arrangement for automatically deploying the patch to systems where the patch has no direct impact and is irrelevant; and
an arrangement for deploying the patch at a time scheduled by a user to systems where the patch has a direct impact and is relevant.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method of classifying and deploying patches to update applications installed on computer systems, comprising:
prior to receiving a patch, creating a patch classification database in a network;
for each computer system in the network,
identifying a first set of elements in the computer system that have a direct impact to the computer system,
identifying a second set of elements in the computer system that are relevant to the computer system,
storing information associated with the identified first and second sets of elements in a record in the patch classification database;
receiving the patch from a developer, the patch being identified and marked by the developer using metadata as whether it has a direct impact on a given computer system in the network;
for each computer system in the network,
getting a respective record from the patch classification database,
scanning the respective record to determine if the patch corresponds to the first set of elements in the computer system has a direct impact on the computer system and if the patch corresponds to the second set of elements in the computer system is relevant to the computer system;
automatically deploying the patch to computer systems where the patch has no direct impact and is irrelevant; and
deploying the patch at a time scheduled by a user to computer systems where the patch has a direct impact and is relevant.

2. The method of claim 1, wherein the patch is automatically deployed to the computer system where the patch has a direct impact on the computer system and is irrelevant to the computer system.

3. The method of claim 1, wherein the patch is automatically deployed to the computer system and the user is notified of the patch therefrom if the patch has no direct impact on the computer system and is relevant to the computer system.

4. The method of claim 1, wherein the relevance of the patch is determined based on whether the user is using an application to which the patch is to be applied.

5. The method of claim 1, wherein the relevance of the patch is determined based on how often an application is used.

6. The method of claim 1, wherein the relevance of the patch is determined based on duration of use of an application.

7. The method of claim 1, wherein the relevance of the patch is determined based on amount of functions used within an application.

8. A method of installing a patch to update an application on a computer terminal, comprising:
prior to receiving the patch from a developer, creating a patch classification database to store an activity profile, the patch being identified and marked by the developer using metadata as whether it has a direct impact on a given computer terminal;
identifying a first set of elements in the computer terminal that have a direct impact to the computer terminal;
identifying a second set of elements in the computer terminal that are relevant to the computer terminal based on the activity profile;
storing information associated with the identified first and second sets of elements in a record in the patch classification database;
responsive to receiving the patch, scanning the record in the patch classification database to determine if the patch corresponds to the first set of elements in the computer terminal has a direct impact on the computer terminal and if the patch corresponds to the second set of elements in the computer terminal is relevant to the computer terminal according to parameters of computer terminal impact and relevance to user activity;
prompting a user for a scheduled time of installation if the patch is classified as having direct impact and relevance to the user activity;
otherwise, automatically selecting the scheduled time of installation according to a default process if the patch is classified as having no direct impact and is irrelevant; and
installing the patch on the computer terminal at the scheduled time of installation.

9. The method of claim 8, wherein the patch is automatically deployed to the computer terminal if the patch has a direct impact on the computer terminal and is irrelevant to the computer terminal.

10. The method of claim 8, wherein the patch is automatically deployed to the computer terminal and the user is notified of the patch therefrom if the patch has no direct impact on the computer terminal and is relevant to the computer terminal.

11. The method of claim 8, wherein the relevance of the patch is determined based on at least one of: whether the application to which the patch is to be applied is in use, how often the application is used, duration of use of the application, and amount of functions used within the application.

12. An article of manufacture comprising a non-transitory computer readable medium storing instructions executed by a processor, the instructions, when executed, performing a method for classifying and deploying patches to update applications installed on computer systems, the method comprising:
prior to receiving a patch, creating a patch classification database in a network;
for each computer system in a network,
identifying a first set of elements in the computer system that have a direct impact to the computer system,
identifying a second set of elements in the computer system that are relevant to the computer system,
storing information associated with the identified first and second sets of elements in a record in the patch classification database;
receiving the patch from a developer, the patch being identified and marked by the developer using metadata as whether it has a direct impact on a given computer system in the network;
for each computer system in the network,
getting a respective record from the patch classification database,
scanning the respective record to determine if the patch corresponds to the first set of elements in the computer system has a direct impact on the computer system and if the patch corresponds to the second set of elements in the computer system is relevant to the computer system;
automatically deploying the patch to computer systems where the patch has no direct impact and is irrelevant; and
deploying the patch at a time scheduled by a user to computer systems where the patch has a direct impact and is relevant.

13. The article of manufacture of claim 12, wherein the patch is automatically deployed to the computer system where the patch has a direct impact on the computer system and is irrelevant to the computer system.

14. The article of manufacture of claim 12, wherein the patch is automatically deployed to the computer system and the user is notified of the patches therefrom where the patch has no direct impact on the computer system and is relevant to the computer system.

15. The article of manufacture of claim 12, wherein the relevance of the patch is determined based on at least one of whether an application to which the patch is to be applied is in use, how often an application is used, duration of use of an application, and amount of functions used within an application.

* * * * *